(12) United States Patent
Cideciyan et al.

(10) Patent No.: US 7,173,784 B2
(45) Date of Patent: Feb. 6, 2007

(54) APPARATUS FOR PROVIDING DATA DEPENDENT DETECTION IN A DATA READ CHANNEL

(75) Inventors: Roy D. Cideciyan, Rueschlikon (CH); Ajay Dholakia, Gattikon (CH); Evangelos Eleftheriou, Zurich (CH); Richard L. Galbraith, Rochester, MN (US); Thomas Mittelholzer, Zurich (CH); Travis R. Oenning, Rochester, MN (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 91 days.

(21) Appl. No.: 10/683,646

(22) Filed: Oct. 10, 2003

(65) Prior Publication Data
US 2005/0078394 A1 Apr. 14, 2005

(51) Int. Cl.
*G11B 5/09* (2006.01)
*H03M 13/03* (2006.01)
*H03D 1/00* (2006.01)

(52) U.S. Cl. .............................. 360/46; 360/25; 360/39; 360/65; 360/29; 375/262; 375/265; 375/341; 714/794; 714/795; 714/799

(58) Field of Classification Search ...................... None
See application file for complete search history.

(56) References Cited

U.S. PATENT DOCUMENTS

| | | | | |
|---|---|---|---|---|
| 5,809,080 A | * | 9/1998 | Karabed et al. | 375/263 |
| 5,961,658 A | * | 10/1999 | Reed et al. | 714/746 |
| 6,104,766 A | * | 8/2000 | Coker et al. | 375/341 |
| 6,148,431 A | * | 11/2000 | Lee et al. | 714/794 |
| 6,158,027 A | * | 12/2000 | Bush et al. | 714/709 |
| 6,201,839 B1 | * | 3/2001 | Kavcic et al. | 375/341 |
| 6,219,387 B1 | * | 4/2001 | Glover | 375/341 |
| 6,320,916 B1 | * | 11/2001 | Kobayashi et al. | 375/341 |
| 6,373,906 B1 | * | 4/2002 | Cideciyan et al. | 375/341 |
| 6,396,254 B1 | * | 5/2002 | Feyh et al. | 324/76.19 |
| 6,460,150 B1 | * | 10/2002 | Cideciyan et al. | 714/709 |
| 6,513,141 B1 | * | 1/2003 | Livingston | 714/792 |
| 6,546,518 B1 | * | 4/2003 | Leung et al. | 714/769 |
| 6,594,094 B2 | * | 7/2003 | Rae et al. | 360/25 |
| 6,717,461 B2 | * | 4/2004 | Krishnapura et al. | 327/552 |
| 6,732,328 B1 | * | 5/2004 | McEwen et al. | 714/795 |
| 6,889,154 B2 | * | 5/2005 | Ashley et al. | 702/107 |
| 2002/0040462 A1 | * | 4/2002 | Sawaguchi et al. | 714/794 |
| 2004/0032683 A1 | * | 2/2004 | Ashley et al. | 360/46 |

FOREIGN PATENT DOCUMENTS

WO    WO 00/33500 A2 * 12/1999

\* cited by examiner

*Primary Examiner*—Wayne Young
*Assistant Examiner*—Dismery Mercedes
(74) *Attorney, Agent, or Firm*—David W. Lynch, Esq.; Chambliss, Bahner & Stophel PC (57) ABSTRACT

An apparatus for providing data dependent detection in a data read channel is disclosed. Parameters in a read channel are dynamically adjusted according to data dependent noise. For example, a comparison in an add-compare-select (ACS) unit of a Viterbi decoder may be adjusted or offset terms in error event filters may be biased to choose a Viterbi sequence with more transitions or to compensate for polarity dependent noise.

42 Claims, 8 Drawing Sheets

Fig. 8

APPARATUS FOR PROVIDING DATA DEPENDENT DETECTION IN A DATA READ CHANNEL

BACKGROUND OF THE INVENTION

1. Field of the Invention

This invention relates in general to data read channels, and more particularly to an apparatus for providing data dependent detection in a data read channel.

2. Description of Related Art

Recently developed data storage devices, such as magnetic disk drive devices (i.e., hard disk drives), have increased storage capacity and increased data access speed. With these advantages, magnetic disk drive devices have become widely used as auxiliary memory devices for computer systems. More generally, developments in pulse communications related to these improvements in disk drive technology have recently provided increased speed and reliability in a wide range of pulse communications systems. The present invention will be described in detail in the context of magnetic disk drive devices, but persons skilled in the pulse communications arts will readily apprehend that this invention provides an improved method for data pulse detection in a wide variety of pulse communication contexts.

The primary features of a magnetic disk drive device that affect storage capacity and access speed are the head, the recording medium, the servo mechanism, the signal processing technique used in the read/write channel, and the like. Among these, signal processing techniques utilizing PRML (Partial Response Maximum Likelihood) detection have greatly contributed to the increased storage capacities and high access speeds seen in modern magnetic disk drive devices.

A read channel circuit in a generic read/write channel circuit of a magnetic disk drive device includes components for initial processing of the analog read signal generated by the read/write head of the device. This processing provides automatic gain control (AGC) amplification, filtering, and equalization, as well as analog-to-digital conversion.

As areal densities increase, inter-symbol interference (ISI), transition-dependent noise and non-linear distortions at high densities and bandwidth limitations at high data rates lead to performance degradation. For example, the level of inter-symbol interference between neighboring recorded bits in magnetic recording channels increases with recording density. Further, there are many sources of noise that contribute to a loss in error rate including data dependent noise sources such as transition noise.

To recover data from a noise contaminated read back signal, read channels receive an analog signal from the preamplifier and send detected data in digital form to the disk drive controller. The read-write channels that are currently most commonly used are based on the partial response approach. In this approach, the channel impulse and a Viterbi detector are used for detecting the data pulses in the digitized read signal and recovering the bits. Advanced replay equalizations have been adopted in the magnetic recording technology to shape the channel pulse response to some specified target shape, which has a shorter duration (higher bandwidth) and this is called partial-response signaling or equalization. A Viterbi detector that is matched to the target shape normally follows the partial response equalizer. Maintaining precisely the desired partial response shape through adaptive equalizations at the channel output permits the Viterbi detector to be efficiently realized and hence improving the bit detection quality. The overall task of the detector is to recover the encoded data that was originally recorded on the magnetic medium.

In this context, such a detector receives an equalized digital read signal and generates from it an encoded data signal, which is then decoded to produce the final read data signal. The various components in such a read/write channel circuit introduce into the design and manufacturing process various parameters whose values affect the data storage density and the access speed of the device.

At the heart of the Viterbi decoding algorithm is the trellis, which is an extension of the encoder state machine that shows the passage of time. A section of the trellis shows the possible state transitions and output codewords for one period of the encoder. Every branch between two states represents a possible state change in the encoder. The Viterbi procedure determines the best path (most likely sequence of symbols from a finite alphabet) ending in each state j, where state j represents the memory in the channel, by comparing the samples in the sample sequence $y_0, y_1, \ldots y_n$ to the expected sequence of read back samples associated with all possible paths that can end in state j at time n.

The "best path" is determined typically by comparing the Euclidean distance between the actual and expected read back sample sequences. This Euclidean distance is often referred to as the state metric (also called the path metric). The best path ending in state j is often defined to be the expected read back sample sequence with the smallest state metric. As known in the art, the state metric can be defined in terms other than the Euclidean distance.

The Euclidean branch metrics may be adjusted based on data dependent noise or its signal dependent structure. However, to adjust the Euclidean branch metrics, separate functions for various states are required. The conventional Viterbi detector operating on an arbitrary generalized partial-response target with L coefficients requires $2^{L-1}$ states with $2^L$ branch metrics. For example, for a target having a length of 5, a 16 state Viterbi is needed.

In a real system there are many sources of noise contributing to a loss in error rate. As described above, the primary function of the disk drive read channel is to reliably recover data from a noise contaminated read back signal. A detection algorithm exploiting the structure of data dependent noise sources is needed to improve the overall error rate. In U.S. Pat. No. 6,102,839, issued Mar. 13, 2001 to Kavcic et al., a method and apparatus for determining branch metric values for branches of a trellis for a Viterbi-like detector was described. According to Kavcic et al., a noise predictive filter and scale was used in every branch of the detector trellis. However, a drawback of this approach is the large complexity associated with a hardware implementation.

It can be seen then that there is a need for an apparatus for providing data dependent detection in a data read channel.

SUMMARY OF THE INVENTION

To overcome the limitations in the prior art described above, and to overcome other limitations that will become apparent upon reading and understanding the present specification, the present invention discloses an apparatus for providing data dependent detection in a data read channel.

The present invention solves the above-described problems by dynamically adjusted parameters in a read channel according to data dependent noise. A comparison in an add-compare-select (ACS) unit of a Viterbi decoder may be adjusted or offset terms in error event filters may be biased to choose a Viterbi sequence with more transitions.

A read channel in accordance with the principles of the present invention includes a Viterbi decoder for decoding a received data stream to produce an estimated sequence representing decoded data bits and a sequence selection stage for analyzing error events and selecting a sequence based upon the analysis of the error events, wherein the sequence selection stage and the Viterbi decoder each include at least one threshold, and wherein at least one of the at least one threshold of the sequence selection stage and the Viterbi decoder is dynamically biased to improve detection reliability in the presence of data dependent noise.

In another embodiment of the present invention, a signal processing system for providing read channel functions is provided. The signal processing system includes a memory for storing data therein and a processor, coupled to the memory, the processor configured for decoding a received data stream to produce an estimated sequence representing decoded data bits, for analyzing error events and for selecting a sequence based upon the analysis of the error events, wherein the processor include at least one threshold, and wherein at least one threshold is dynamically biased to improve detection reliability in the presence of data dependent noise.

In another embodiment of the present invention, a signal processor configured for performing read channel operations is provided. The signal processor decodes a received data stream to produce an estimated sequence representing decoded data bits, analyzes error events and selects a sequence based upon the analysis of the error events based upon a chosen threshold, the threshold being dynamically biased to improve detection reliability in the presence of data dependent noise.

In another embodiment of the present invention, a data storage system is provided. The data storage system includes at least one storage medium for storing data thereon, a motor for moving the at least one storage medium, a transducer, operatively coupled to the at least one storage medium, for reading and writing data on the at least one storage medium, an actuator, coupled to the transducer, for translating the transducer relative to the at least one storage medium and a read channel for processing a data stream received via the transducer, the read channel further including a Viterbi decoder for decoding a received data stream to produce an estimated sequence representing decoded data bits and a sequence selection stage for analyzing error events and selecting a sequence based upon the analysis of the error events, wherein the sequence selection stage and the Viterbi decoder each include at least one threshold, and wherein at least one of the at least one threshold of the sequence selection stage and the Viterbi decoder is dynamically biased to improve detection reliability in the presence of data dependent noise.

In another embodiment of the present invention, a read channel is provided. The read channel includes means for decoding a received data stream to produce an estimated sequence representing decoded data bits and means for analyzing error events and selecting a sequence based upon the analysis of the error events, wherein the means for analyzing error events and the means for decoding each include at least one threshold, and wherein at least one of the at least one threshold of the means for analyzing error events and the means for decoding is dynamically biased to improve detection reliability in the presence of data dependent noise.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides an apparatus for providing data dependent detection in a data read channel. According to embodiments of the present invention, parameters in a read channel are dynamically adjusted according to data dependent noise. For example, a comparison in an add-compare-select (ACS) unit of a Viterbi decoder may be adjusted or offset terms in error event filters may be biased to choose a Viterbi sequence with more transitions.

Figure 1:
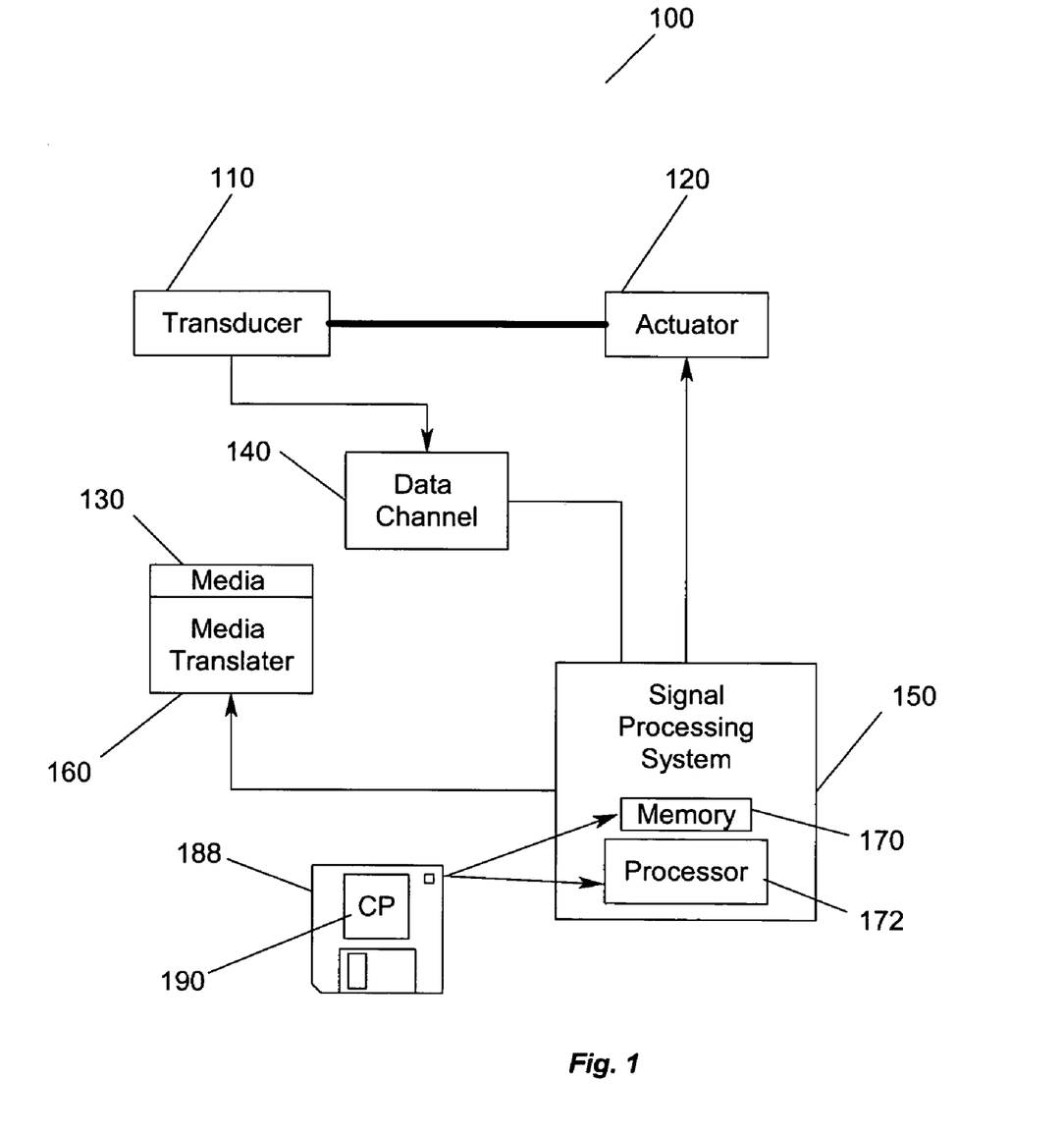
FIG. 1 illustrates a storage system according to an embodiment of the present invention.

FIG. 1 illustrates a storage system 100 according to an embodiment of the present invention. In FIG. 1, a transducer 110 is under control of an actuator 120. The actuator 120 controls the position of the transducer 110. The transducer 110 writes and reads data on magnetic media 130. The read/write signals are passed to a data channel 140. A signal processor system 150 controls the actuator 120 and processes the signals of the data channel 140. In addition, a media translator 160 is controlled by the signal processor system 150 to cause the magnetic media 130 to move relative to the transducer 110. Nevertheless, the present invention is not meant to be limited to a particular type of storage system 100 or to the type of media 130 used in the storage system 100.

Figure 2:
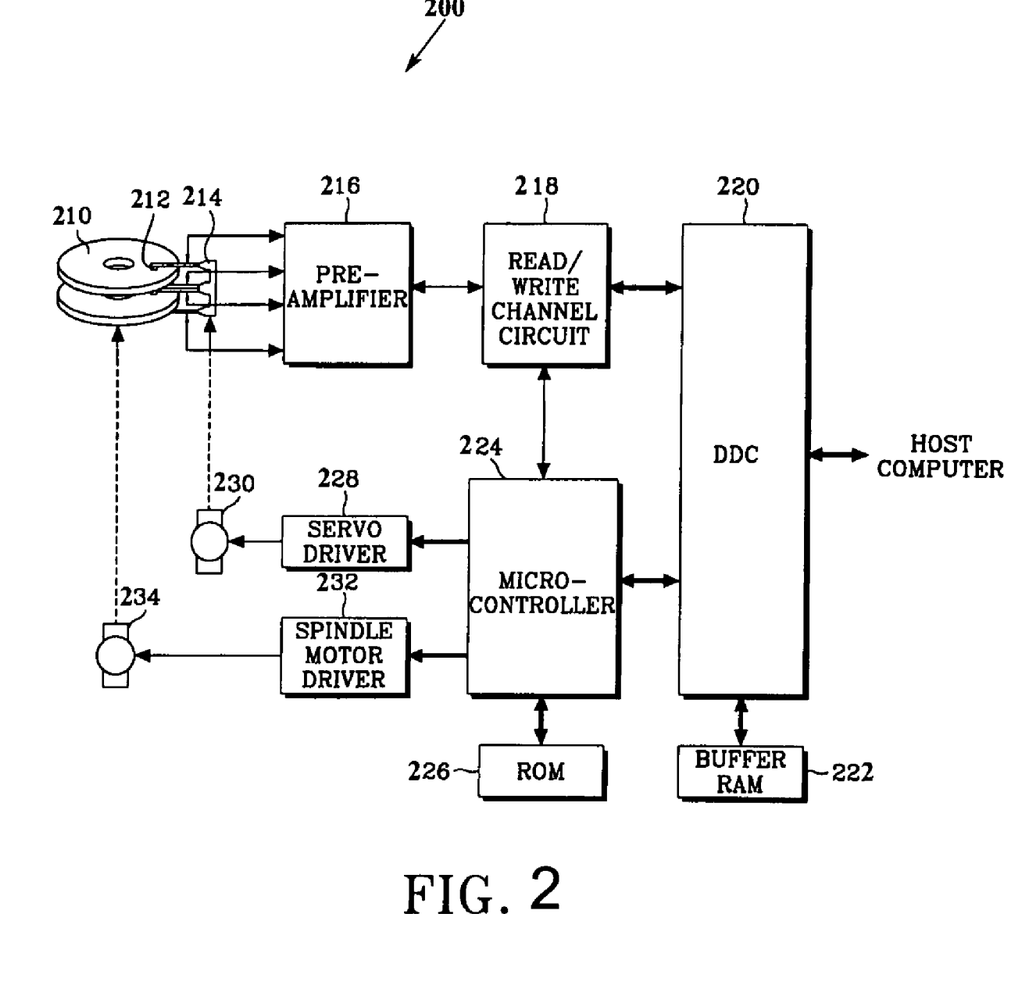
FIG. 2 is a block diagram of a magnetic disk drive device according to an embodiment of the present invention.

FIG. 2 is a block diagram of a magnetic disk drive device 200 according to an embodiment of the present invention. In FIG. 2, disks 210 are rotated by a spindle motor 234, and heads 212 are positioned at surfaces of corresponding ones of disks 210. Heads 212 are mounted on corresponding servo arms that extend from an E-shaped block assembly 214 to disks 210. Block assembly 214 has an associated rotary voice coil actuator 230 that moves block assembly 214 and thereby changes to positions of heads 212 for reading data from or writing data to a specified position on one or more of disks 210.

A pre-amplifier 216 pre-amplifies a signal picked up by heads 212 and thereby provides read/write channel circuit 218 with an amplified signal during a reading operation. During a write operation, pre-amplifier 216 transfers an encoded write data signal from the read/write channel circuit 218 to heads 212. In a read operation, read/write channel circuit 18 detects a data pulse from a read signal provided by pre-amplifier 216 and decodes the data pulse. Read/write channel circuit 218 transfers the decoded data pulse to a disk data controller (DDC) 20. Furthermore, read/write channel circuit 18 also decodes write data received from the DDC 220 and provides the decoded data to pre-amplifier 216.

DDC 220 both writes data received from a host computer (not shown) onto disks 210, through read/write channel circuit 18 and pre-amplifier 216, and transfers read data from disks 210 to the host computer. DDC 220 also interfaces between the host computer and a microcontroller 224. A buffer RAM (Random Access Memory) 222 temporarily stores data transferred between DDC 220 and the host computer, microcontroller 224, and read/write channel circuit 218. Microcontroller 224 controls track seeking and track following functions in response to read and write commands from the host computer.

A ROM (Read Only Memory) 226 stores a control program for microcontroller 224 as well as various setting values. A servo driver 228 generates a driving current for driving actuator 230 in response to a control signal, generated from microcontroller 224 that provides control of the position of heads 212. The driving current is applied to a voice coil of actuator 230. Actuator 230 positions heads 212 relative to disks 210 in accordance with the direction and amount of the driving current supplied from servo driver 228. A spindle motor driver 232 drives spindle motor 234, which rotates disks 210, in accordance with a control value generated from microcontroller 224 for controlling disks 210.

Figure 3:
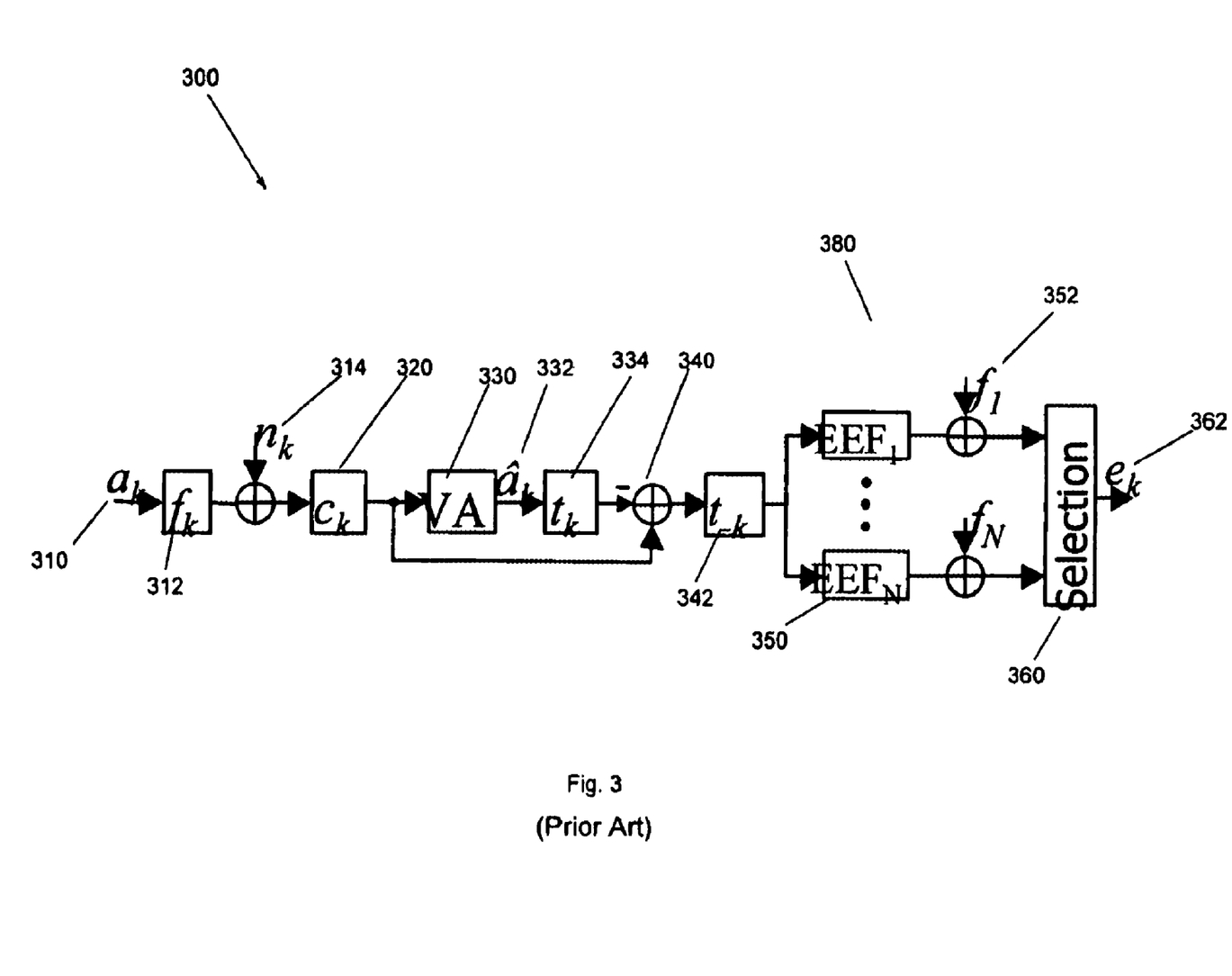
FIG. 3 illustrates a read channel.

FIG. 3 illustrates a read channel 300. In FIG. 3, written data bits $a_k$ 310, when read back, can be thought of as being filtered by some responses $f_k$ 312 and corrupted with noise $n_k$ 314. This signal is then equalized by $c_k$ 320 such that the combined effect of $f_k$ and $c_k$ is some desired target response given by $t_k$. The Viterbi Algorithm 330 is then used to obtain an estimate $\hat{a}_k$ 332 of the data sequence $a_k$. This estimate 332 is then filtered by the target response $t_k$ 334 to obtain a noiseless version of the equalizer output which is then subtracted 340 from the output of the noisy equalizer 320 and filtered by the time reversed target response 342. The time-reversed filter 342 is also referred to as the matched filter. The output of the matched filter 342 is then input to each of N different error event filters 350 of a sequence selection stage 380.

An offset term 352 specific to the output of each error event filter 350 is then used to modify the output of an error event filter 350 before sending the result on to a selection algorithm block 360. The selection block 360 uses a specific algorithm for deciding on an error sequence $e_k$ 362. This error sequence 362 can then be used to improve the reliability of the original decisions made at the output of the Viterbi Algorithm 330. Note that the error event filters 350 may incorporate an additional filtering component common across all the filters the effect of which is a target that is longer than the original $t_k$. Those skilled in the art will recognize that the present invention is not meant to be limited to a particular selection algorithm 360, but rather is applicable to any selection algorithm 360 that may be employed. Examples of which include but are not limited to: 1) selection algorithms incorporating prior knowledge of parity constraints on blocks of the encoded $a_k$ data steam, and 2) windowed selection algorithms that do not rely on parity constraints for determining the error sequence $e_k$.

The primary source of data dependent noise in magnetic recording is transition noise. As the name indicates this means there is more noise associated with patterns containing many transitions as compared with patterns containing few transitions. It follows, therefore, that an $\hat{a}_k$ 332 at the output of the Viterbi Algorithm 330 is more likely to be in error if the correct pattern surrounding the $\hat{a}_k$ 332 contains many transitions. Each error event branch 350 in FIG. 3 can be thought of as hypothesizing a particular error event for consideration.

Figure 4:
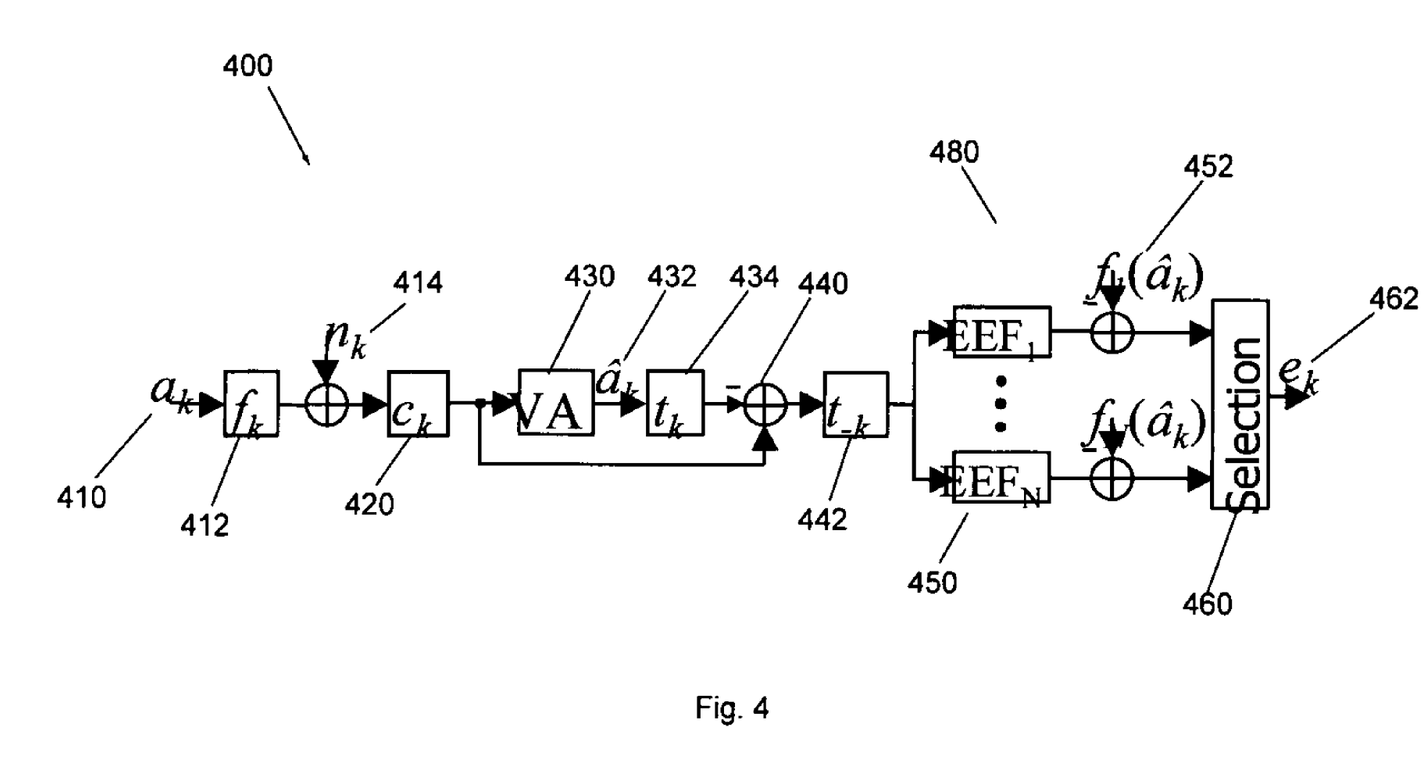
FIG. 4 illustrates a read channel according to an embodiment of the present invention.

FIG. 4 illustrates a read channel 400 according to an embodiment of the present invention. In FIG. 4, written data bits $a_k$ 410, when read back, can be thought of as being filtered by some response $f_k$ 412 and corrupted with noise $n_k$ 414. This signal is then equalized by $c_k$ 420 such that the combined effect of $f_k$ and $c_k$ is some desired target response given by $t_k$. The Viterbi Algorithm 430 is then used to obtain an estimate $\hat{a}_k$ 432 of the data sequence $a_k$ 410. This estimate 432 is then filtered by the target response $t_k$ 434 to obtain a noiseless version of the equalizer output which is then subtracted 440 from the output of the equalizer 420 and filtered by the time reversed target response 442, i.e., the matched filter. The output of the matched filter 442 is then input to each of N different error event filters 450 of a sequence selection stage 480.

An offset term 452 specific to an output of each error event filter 450 is then used to modify the output of an error event filter 450 before sending the result on to a selection algorithm block 460. The selection block 460 uses a specific algorithm for deciding on an error sequence $e_k$ 462.

The read channel 400 according to an embodiment of the present invention improves data reliability in the presence of data dependent noise with proper biasing. A first method involves a modification of the offset term 452 specific to an output of each error event filter 450. According to an embodiment of the present invention, the offset terms $f_1$, $f_2$, . . . , $f_N$ 452 shown in FIG. 4 are made dependent on the $\hat{a}_k$ 432 sequence at the output of the Viterbi algorithm 430. Error rate performance is thus improved by proper choice of $f_1(\hat{a}_k)$, $f_2(\hat{a}_k)$, . . . , $f_N(\hat{a}_k)$.

The $\hat{a}_k$ dependent offset values 452 are determined by biasing of the original offset terms $f_1$, $f_2$, . . . , $f_N$ 352 shown in FIG. 3. If the hypothesized error event leaves the total number of transitions in the Viterbi detected $\hat{a}_k$ sequence 432 unchanged, then no biasing of the original offset term is performed. If the hypothesized error event decreases the number of transitions in the Viterbi detected $\hat{a}_k$ sequence 432, then the original offset term is biased 452 to make the choice look less likely to the selection algorithm. If the hypothesized error event increases the number of transitions in the Viterbi detected $\hat{a}_k$ sequence 432, then the original offset term are biased 452 to make the choice look more likely to the selection algorithm.

The direction of the bias therefore depends only on the $\hat{a}_k$ sequence 432 and the error event 450 being considered. The amount of bias depends on the number of transitions the hypothesized error event 450 will change, which error event 450 is being hypothesized, and the severity of the transition noise in the system. The last point is perhaps most clear because a system with a relatively large amount of transition noise requires larger amounts of biasing as compared to a system with very little transition noise.

Determining the amount of bias based on the number of transitions that the hypothesized error event 450 will change and on which error event 450 is being hypothesized is best described using an example. Suppose the error event being considered 450 consists of two adjacent bits in error, that is, the $\hat{a}_k$ sequence 432 is incorrect in only two adjacent positions. In this case the hypothesized error event 450 can change the number of transitions by 4, by 2, or leave the number of transitions unchanged. In this situation more biasing is used when 4 transitions change compared to when only 2 transitions change.

Figure 5:
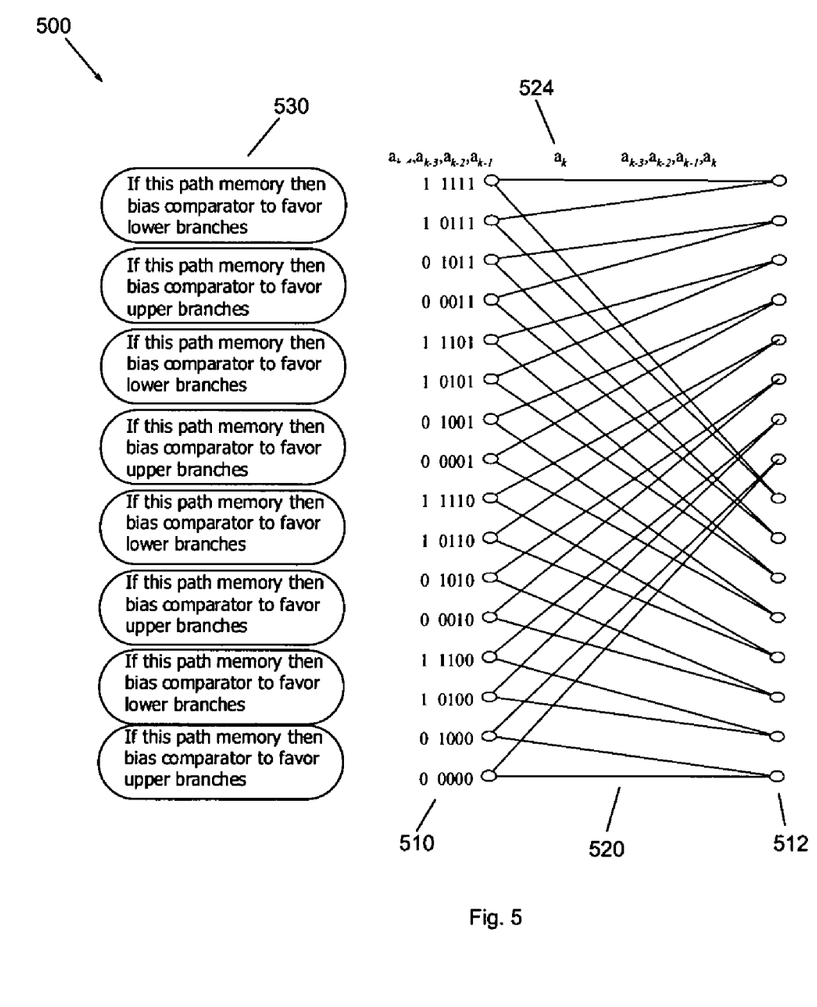
FIG. 5 shows a 16-state trellis according to an embodiment of the present invention.
Figure 7:
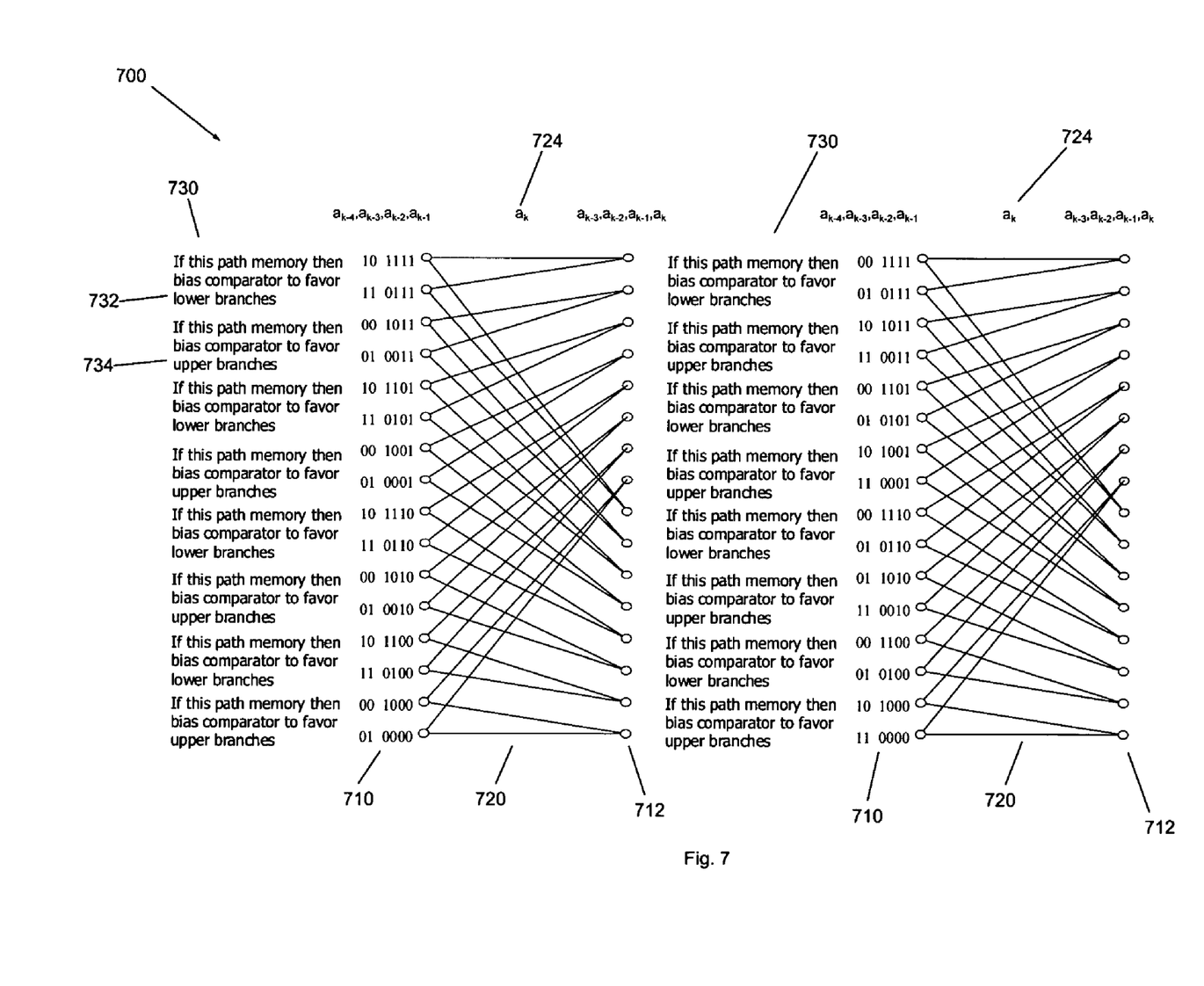
FIG. 7 shows the specific case for an error event consisting of two adjacent bits in error.

According to another embodiment of the present invention, detector reliability in the presence of data dependent noise is improved by modifying the comparators (as shown in FIG. 7 below) used in the Viterbi Algorithm 430. The Viterbi Algorithm 430 can be thought of as operating on a trellis structure 500 such as that depicted in FIG. 5. The trellis 500 includes states 510, 512 and branches 520. FIG. 5 shows a 16-state trellis 500, which is typical of current state-of-the-art implementations used in magnetic recording data channels. As shown in FIG. 5, states 510, 512 are determined by a string of consecutive $a_k$'s 524 and branches 520 connect states 510, 512 according to what $a_k$ leads to the next state. In the Viterbi Algorithm, a metric is associated with each branch 520 in the trellis 500.

Figure 6:
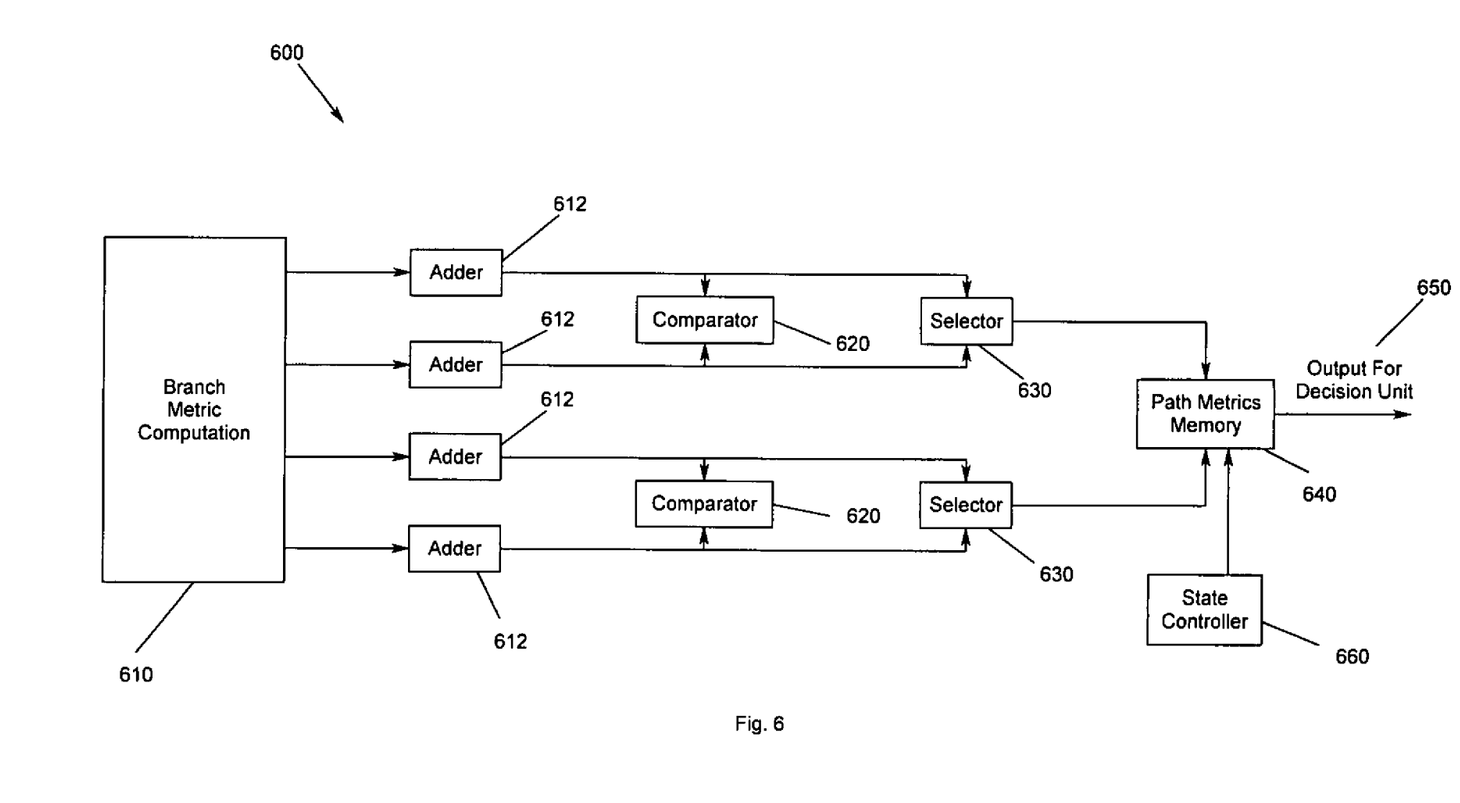
FIG. 6 illustrates one example of a block diagram of an ACS unit that may be used in a Viterbi decoder according to an embodiment of the present invention.

FIG. 6 illustrates one example of a block diagram of an ACS unit 600 that may be used in a Viterbi decoder according to an embodiment of the present invention. In FIG. 6, branch metric generator 610 computes branch metrics representing the minimum distance. The distance between two strings of bits (binary integers) is the number of corresponding bit positions that differ. The branch metric is added 612 to the previous accumulated metric for that path to obtain a current accumulated metric. Next, the current accumulated metric is compared 620 with current accumulated metrics from competing paths entering the same state. Finally, the best resulting metric is selected 630, the metric is stored in path metrics memory 640 for use as the previous accumulated metric in the next step, and the associated path is saved in path metrics memory 640. The path metrics memory 640 provides an output 650 for the decision unit (not shown). A state controller 660 controls the state of the path metrics memory 640 to provide the proper output 650 to the decision unit (not shown).

According to an embodiment of the present invention, the compare operation 620 is dynamically biased to provide improved error rate based upon what is in path memory. A subtle but important distinction is that the comparator 620 is biased, not the values being compared. In other words, the worse of two metrics might be selected due to the bias in the comparator 620, and in this case the worse of the two metrics is also stored in the path metrics memory 640 for use as the previous accumulated metric in the next step.

The biases used in the compares when compensating only for single bit error events are chosen as depicted in FIG. 5. As shown in FIG. 5, biasing of thresholds is determined by looking into path memory and making a decision based upon the review of path memory 530. As with the previously described method of modifying offset used after error event filters described with reference to FIG. 4, biasing may be applied in the direction of choosing the sequence with more transitions. Longer error events are handled in a similar manner by considering information deeper in path memory.

Alternatively, biasing may be applied to compensate for polarity dependent noise. For example, biasing may be applied that favors choosing a sequence with more ones when polarity dependent noise makes ones more noisy, or that favors choosing a sequence with more zeroes when polarity dependent noise makes zeroes more noisy.

For example, FIG. 7 shows the specific case for an error event consisting of two adjacent bits in error 700. In FIG. 7, the trellis 700 includes states 710, 712 and branches 720. FIG. 7 shows a 16-state trellis 700, wherein two adjacent bits are considered. As shown in FIG. 7, states 710, 712 are determined by a string of consecutive $a_k$'s 724 and branches 720 connect states 710, 712 according to what $a_k$ 724 leads to the next state. In the Viterbi Algorithm, a metric is associated with each branch 720 in the trellis 700. Biasing of thresholds is determined by looking into path memory and making a decision based upon the review of path memory 730. As with the previously described method of modifying offset used after error event filters described with reference to FIG. 4, biasing may be applied in the direction of choosing the sequence with more transitions. For example, favor of the lower 732 or upper 734 branches is given depending upon the path memory 730. Alternatively, biasing may be applied to compensate for polarity dependent noise. For example, biasing may be applied that favors choosing a sequence with more ones when polarity dependent noise makes ones more noisy, or that favors choosing a sequence with more zeroes when polarity dependent noise makes zeroes more noisy.

Note that when a list of error events is being compensated for the approach for shorter error events differs slightly in that additional agreement further in path memory is required. For example, in FIG. 5 additional bits of path memory would be required to agree to prevent overlap with cases involving other error events in the list.

Figure 8:
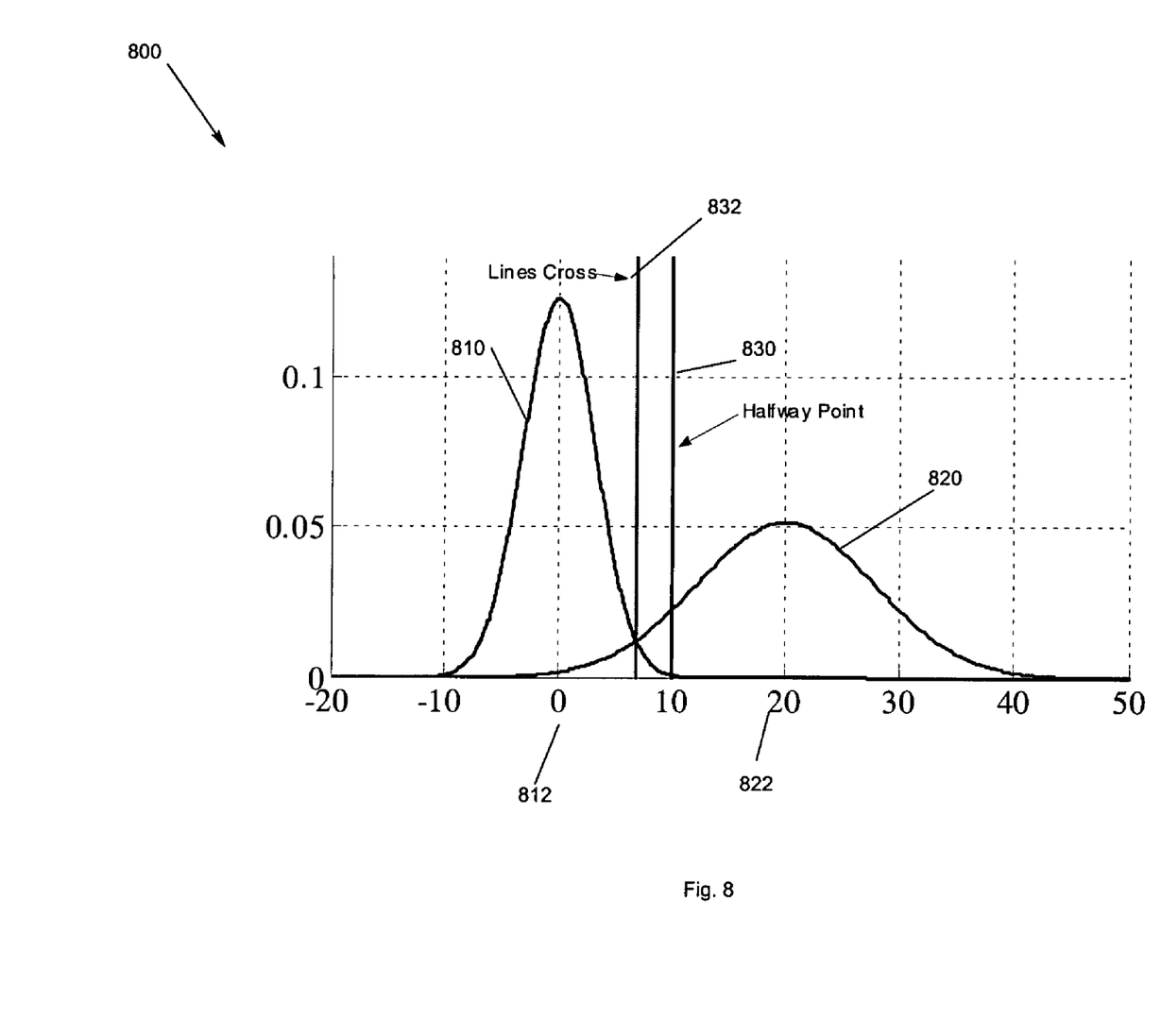
FIG. 8 is a diagram of signals that demonstrates the effect of dynamic adjusting of thresholds for improving detection reliability in the presence of data dependent noise according to an embodiment of the present invention.

FIG. 8 is a diagram 800 of signals that demonstrates the effect of dynamic adjusting of thresholds for improving detection reliability in the presence of data dependent noise according to an embodiment of the present invention. In FIG. 8, two signals 810, 820 are shown using a radar system as an example. Detection of the presence or absence of a target is the goal of a radar system. Accordingly, a radar system transmits an electromagnetic pulse and listens to see whether or not there is a reflection from a target. For simplicity assume the listening receiver outputs a single number as an answer. For example, nominally the output is zero 812 for no reflection and twenty 822 if there is a reflection. In the presence of no reflection, a receiver will still pick up a signal 810 representing various sources of background noise. Thus, the output will vary about zero 812. In the presence of a reflection, the receiver picks up a signal representing the scattered (noisy) reflected pulse 820 in addition to the background noise so that this case is overall much noisier. After a value r is received, a decision needs to be made between two cases:

r=n0, where n0 is Guassian with mean 0 and variance 10 (represented by signal 810), or r=s+n1, where s=20 and n1 is Guassian with mean 0 and variance 60 (represented by signal 820).

To decide, the value r is compared to some threshold, e.g., 830, 832. The probability of error is determined by the tails of the distributions. The error is minimized by choosing the threshold 832. The error from threshold 832 is equal to the sum of the area under the portion of signal 820 to the left of the threshold line 832 and the portion of signal 810 to the right of the threshold line 832. This is compared to the error from using threshold 830 that is equal to the sum of the area under the portion of signal 820 to the left of the threshold line 830 and the portion of signal 810 to the right of the threshold line 830. Clearly the error produced using threshold 832 is less.

The process illustrated with reference to FIGS. 1–8 may be tangibly embodied in a computer-readable medium or carrier, e.g. one or more of the fixed and/or removable data storage devices 188 illustrated in FIG. 1, or other data storage or data communications devices. The computer program 190 may be loaded into memory 170 to configure the processor 172 for execution of the computer program 190. The computer program 190 include instructions which, when read and executed by a processor 172 of FIG. 1, causes the devices to perform the steps necessary to execute the steps or elements of an embodiment of the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A read channel, comprising:
   a Viterbi decoder for decoding a received data stream to produce an estimated sequence representing decoded data bits; and
   a sequence selection stage for analyzing error events and selecting a sequence based upon the analysis of the error events;
   wherein the sequence selection stage and the Viterbi decoder each include at least one threshold, and wherein at least one threshold of the sequence selection stage and the Viterbi decoder is dynamically biased to improve detection reliability in the presence of data dependent noise and wherein an offset term is provided specific for the sequence selection stage to produce an error sequence, the offset terms comprising an offset threshold dependent upon the sequence at the output of the Viterbi decoder.

2. The read channel of claim 1 further comprising an equalizer for receiving a readback signal and producing a desired target response at the Viterbi decoder.

3. The read channel of claim 1, wherein the Viterbi decoder further comprises:
   a branch metric generator for generating distance metrics for a received data stream;
   a plurality of adders for adding the distance metric for each possible branch to a previously accumulated path metric to produce a revised path metric for each branch;
   at least one comparator for comparing the revised path metric for a plurality of branches; and
   a selector for selecting a path metric for a path having a smallest path metric.

4. The read channel of claim 3, wherein the at least one comparator includes a threshold for making a bias adjustment to improve detection reliability in the presence of data dependent noise.

5. The read channel of claim 4, wherein the threshold is adjusted to choose a sequence with more transitions.

6. The read channel of claim 4, wherein the threshold is adjusted to choose a sequence that compensates for polarity dependent noise.

7. The read channel of claim 6, wherein the threshold is adjusted to choose a sequence with more ones when polarity dependent noise makes ones more noisy.

8. The read channel of claim 6, wherein the threshold is adjusted to choose a sequence with more zeroes when polarity dependent noise makes zeroes more noisy.

9. The read channel of claim 1, wherein the sequence selection stage further comprises:
   a plurality of error event filters, operatively coupled to the Viterbi decoder, for identifying an error event and producing an output error;
   a plurality of adders, coupled to the error event filters, for combining the output error with the offset term specific for each error event filter to produce an error sequence; and
   a selector for deciding on one error sequence from the plurality of adders.

10. The read channel of claim 9, wherein each of the offset terms comprise a threshold, each of the offset thresholds being adjusted to improve detection reliability in the presence of data dependent noise.

11. The read channel of claim 1, wherein the offset terms comprising an offset threshold are adjusted to choose a sequence with more transitions.

12. The read channel of claim 1, wherein the offset terms comprising an offset threshold are adjusted to choose a sequence that compensates for polarity dependent noise.

13. The read channel of claim 12, wherein the offset threshold is adjusted to choose a sequence with more ones when polarity dependent noise makes ones more noisy.

14. The read channel of claim 12, wherein the offset threshold is adjusted to choose a sequence with more zeroes when polarity dependent noise makes zeroes more noisy.

15. A signal processing system for providing read channel functions, comprising:
   a memory for storing data therein; and
   a processor, coupled to the memory, the processor configured for decoding a received data stream to produce an estimated sequence representing decoded data bits, for analyzing error events and for selecting a sequence based upon the analysis of the error events;
   wherein the processor includes at least one threshold, and wherein at least one threshold is dynamically biased to improve detection reliability in the presence of data dependent noise and wherein an offset term is provided specific for the selected sequence to produce an error sequence, the offset terms comprising an offset threshold dependent upon the sequence selected by the processor.

16. The signal processing system of claim 15, wherein the processor is further configured for receiving a readback signal and producing a desired equalized target response.

17. The signal processing system of claim 15, wherein the processor is further configured for adding the distance metric for each possible branch to a previously accumulated path metric to produce a revised path metric for each branch, for comparing the revised path metric for a plurality of branches and for selecting a path metric for a path having a smallest path metric.

18. The signal processing system of claim 17, wherein the processor adjusts the comparing based upon adjustment of the threshold to improve detection reliability in the presence of data dependent noise.

19. The signal processing system of claim 18, wherein the threshold is adjusted to choose a sequence with more transitions.

20. The signal processing system of claim 18, wherein the threshold is adjusted to choose a sequence that compensates for polarity dependent noise.

21. The signal processing system of claim 20, wherein the threshold is adjusted to choose a sequence with more ones when polarity dependent noise makes ones more noisy.

22. The signal processing system of claim 20, wherein the threshold is adjusted to choose a sequence with more zeroes when polarity dependent noise makes zeroes more noisy.

23. The signal processing system of claim 15, wherein the offset terms comprise an offset threshold, each of the thresholds being adjusted to improve detection reliability in the presence of data dependent noise.

24. The signal processing system of claim 23, wherein the offset terms comprising an offset threshold are made dependent upon the estimated sequence.

25. The signal processing system of claim 24, wherein the offset terms comprising an offset threshold are adjusted to choose a sequence with more transitions.

26. A signal processor configured for performing read channel operations, wherein the signal processor decodes a received data stream to produce an estimated sequence representing decoded data bits, analyzes error events and selects a sequence based upon the analysis of the error events based upon a chosen threshold, wherein the threshold is dynamically biased to improve detection reliability in the presence of data dependent noise and based upon an offset term specific for the selected sequence for producing an error sequence, the offset terms comprising an offset threshold dependent upon the sequence selected by the signal processor.

27. A data storage system, comprising:
at least one storage medium for storing data thereon;
a motor for moving the at least one storage medium;
a transducer, operatively coupled to the at least one storage medium, for reading and writing data on the at least one storage medium;
an actuator, coupled to the transducer, for translating the transducer relative to the at least one storage medium; and
a read channel for processing a data stream received via the transducer, the read channel further comprising:
a Viterbi decoder for decoding a received data stream to produce an estimated sequence representing decoded data bits; and
a sequence selection stage for analyzing error events and selecting a sequence based upon the analysis of the error events;
wherein the sequence selection stage and the Viterbi decoder each include at least one threshold, and wherein at least one of the threshold of the sequence selection stage and the Viterbi decoder is dynamically biased to improve detection reliability in the presence of data dependent noise and wherein an offset term is provided specific for the sequence selection stage to produce an error sequence, the offset terms comprising an offset threshold dependent upon the sequence at the output of the Viterbi decoder.

28. The data storage system of claim 27 further comprising an equalizer for receiving a readback signal and producing a desired target response at the Viterbi decoder.

29. The data storage system of claim 27, wherein the Viterbi decoder further comprises:
a branch metric generator for generating distance metrics for a received data stream;
a plurality of adders for adding the distance metric for each possible branch to a previously accumulated path metric to produce a revised path metric for each branch;
at least one comparator for comparing the revised path metric for a plurality of branches; and
a selector for selecting a path metric for a path having a smallest path metric.

30. The data storage system of claim 29, wherein the at least one comparator adjusts the threshold for making a bias adjustment to improve detection reliability in the presence of data dependent noise.

31. The data storage system of claim 30, wherein the threshold is adjusted to choose a sequence with more transitions.

32. The data storage system of claim 30, wherein the threshold is adjusted to choose a sequence that compensates for polarity dependent noise.

33. The data storage system of claim 32, wherein the threshold is adjusted to choose a sequence with more ones when polarity dependent noise makes ones more noisy.

34. The data storage system of claim 32, wherein the threshold is adjusted to choose a sequence with more zeroes when polarity dependent noise makes zeroes more noisy.

35. The data storage system of claim 27, wherein the sequence selection stage further comprises:
a plurality of error event filters, operatively coupled to the Viterbi decoder, for identifying an error event and producing an output error;
a plurality of adders, coupled to the error event filters, for combining the output error with the offset term specific for each error event filter to produce an error sequence; and
a selector for deciding on one error sequence from the plurality of adders.

36. The data storage system of claim 35, wherein each of the offset terms comprise an offset threshold, each of the thresholds being adjusted to improve detection reliability in the presence of data dependent noise.

37. The data storage system of claim 36, wherein the offset terms comprising an offset threshold are made dependent upon the sequence at the output of the Viterbi decoder.

38. The data storage system of claim 37, wherein the offset terms comprising an offset threshold are adjusted to choose a sequence with more transitions.

39. The data storage system of claim 37, wherein the offset threshold is adjusted to choose a sequence that compensates for polarity dependent noise.

40. The data storage system of claim 39, wherein the offset threshold is adjusted to choose a sequence with more ones when polarity dependent noise makes ones more noisy.

41. The data storage system of claim 39, wherein the offset threshold is adjusted to choose a sequence with more zeroes when polarity dependent noise makes zeroes more noisy.

42. A read channel, comprising:
means for decoding a received data stream to produce an estimated sequence representing decoded data bits; and
means for analyzing error events and selecting a sequence based upon the analysis of the error events;
wherein the means for analyzing error events and the means for decoding each include at least one threshold, and wherein at least one of the threshold of the means for analyzing error events and the means for decoding is dynamically biased to improve detection reliability in the presence of data dependent noise and wherein an offset term is provided specific for means for analyzing error events and selecting a sequence to produce an error sequence, the offset terms comprising an offset threshold dependent upon the sequence at the output of the means for decoding.

* * * * *

UNITED STATES PATENT AND TRADEMARK OFFICE
CERTIFICATE OF CORRECTION

PATENT NO. : 7,173,784 B2
APPLICATION NO. : 10/683646
DATED : February 6, 2007
INVENTOR(S) : Cideciyan et al.

It is certified that error appears in the above-identified patent and that said Letters Patent is hereby corrected as shown below:

Col. 10, Line 44: "selected sequence" should read -- sequence selection stage --
Col. 10, Line 46: "selected by the processor." should read -- at the output of the Viterbi decoder. --
Col. 10, Line 50: "response." should read -- response at the Viterbi decoder. --
Col. 11, Line 18: "decodes" should read -- decoding --
Col. 11, Line 20: "analyzes" should read --analyzing --
Col. 11, Line 21: "selects" should read -- selecting --
Col. 11, Line 24: "selected sequence" should read -- sequence selection stage --
Col. 11, Line 26: "selected by the signal processor." should read -- at the output of the Viterbi decoder. --

Signed and Sealed this

Eighth Day of May, 2007

JON W. DUDAS
*Director of the United States Patent and Trademark Office*